Jan. 23, 1968  S. D. WILSON  3,364,734

TORSIONAL VANE SHEAR APPARATUS FOR EARTH TESTING

Filed Feb. 12, 1965

INVENTOR.
STANLEY D. WILSON

BY

ATTORNEYS

United States Patent Office 3,364,734
Patented Jan. 23, 1968

3,364,734
TORSIONAL VANE SHEAR APPARATUS FOR EARTH TESTING
Stanley D. Wilson, Seattle, Wash., assignor to Slope Indicator Company, Seattle, Wash.
Filed Feb. 12, 1965, Ser. No. 432,316
1 Claim. (Cl. 73—101)

This invention relates to an earth testing instrument. More particularly, the invention concerns torsional vane shear strength testing apparatus to determine characteristics of earth samples taken at various depths and in various zones.

A main purpose of the invention is to provide torsional vane shear apparatus which is conveniently and quickly operated to obtain accurate initial direct reading data concerning shear stresses created in earth samples.

In attaining this purpose, the following objectives are fulfilled: to keep the apparatus compact and sturdy, the overall axial length of the apparatus is reduced by using both overlapping and surrounding components; such reduced length assures its convenient and accurate application in a perpendicular and inter-facial contact relationship with any earth test sample; also, such reduced length requires only one location for axially aligned friction reducing means; moreover, a geometric plane-defining face or surface of its vaned shear head governs the correct immersion of its claw torsion shear blades in all earth samples as this vaned shear head face makes and retains an interfacial contact with face of any earth sample; in addition, these claw torsion shear vanes are radially oriented and spaced on this earth contacting face of the vaned shear head or claw to remain substantially free of clogging earth particles both during and after each shear test; then, in regard to the overall assembly of the apparatus, there is one principal and essential governing fastening-adjusting means which is tightened or released by using conventional tools, one tool being placed at each respective axial end of the apparatus; and also to be considered, all the respective components of this torsional vane shear apparatus are quickly interchanged or adjusted, as necessary, during calibration or repair operations.

A preferred embodiment of the invention is illustrated in the accompanying drawings, wherein.

This invention, as illustrated in these figures and modified as indicated later in the following description, is used by people who are studying earth conditions and making analyses of earth data and therefore considering earth as an engineering and scientific medium. Through their analyses of compiled initially directly read data, obtained by operating this torsional vane shear apparatus, these persons are able to render well founded opinions and predictions regarding, for example, possible earthquake initiated earth movements and also both the best methods and associated lower costs of intended earth movements by earth-moving machines and other means.

The illustrated embodiment of this torsional vane shear apparatus 10 is best employed as tests of earth shear stress are made at locations spaced along an earth sample 12. Generally, an undisturbed "Shelby" tube earth sample, brought into a laboratory from a field, is first cut longitudinally at slightly above its mid-height with a wire saw (not shown) to provide a smooth level undisturbed surface 14 along which the tests are made.

Figure 1:
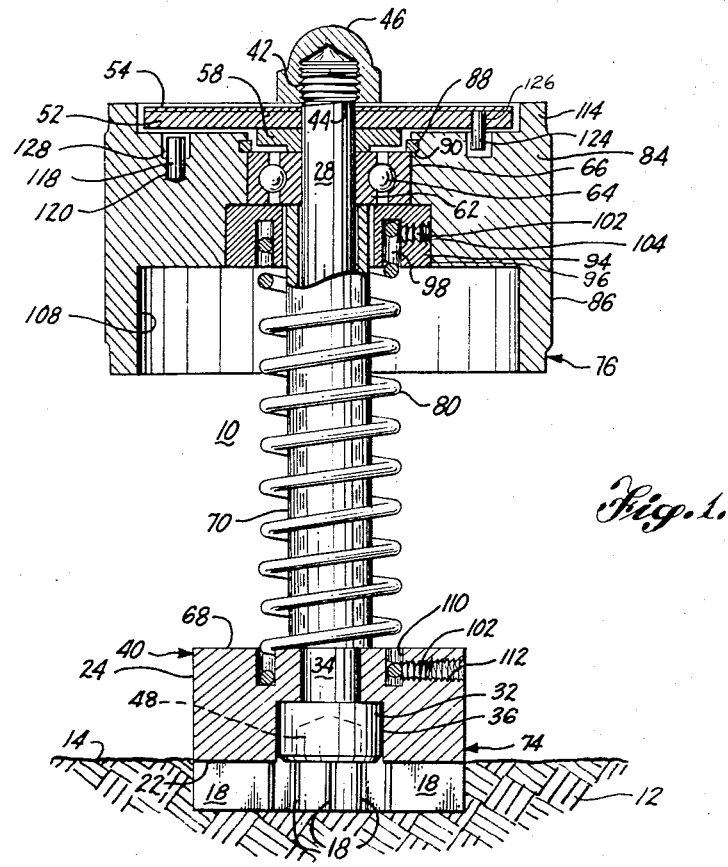
FIGURE 1 is a side view of the torsional vane shear apparatus, under load, with portions of many components broken away generally along a reference plane which passes through the longitudinal axis, and also the torsional shear vanes are shown properly positioned in a portion of an earth sample.

Then torsional vanes of an earth contacting assembly are carefully pushed perpendicularly into soil 12. These vanes, wings, or blades 18 are radially spaced on a plane defining surface or bottom face 22 of a blade support, vaned shead head, or cylinder 24 and are formed as thin rectangular blades 18 of less than radial length. Only the full blade depth is involved for the perpendicularly directed pushing force is stopped when bottom face 22 reaches earth surface 14 in an inter-face contact relationship, as illustrated in FIGURE 1.

Figure 2:
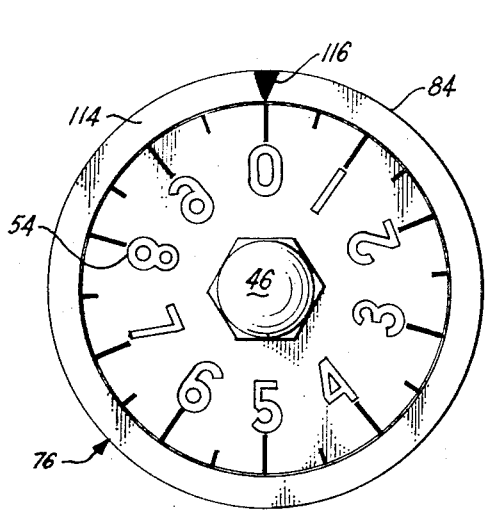
FIGURE 2 is a top view of the torsional vane shear apparatus.
Figure 3:
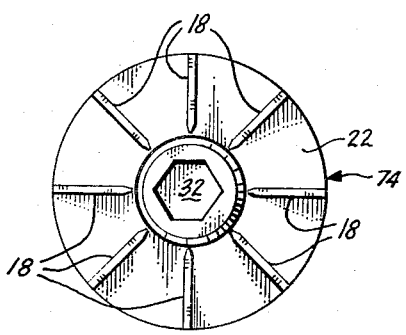
FIGURE 3 is a bottom view of the torsional vane shear apparatus.

Torque is then applied to torsional vane shear apparatus 10 and consequently indirectly to earth 12 to eventually cause movement of the earth. The torque required is easily applied and directly read to determine resisting earth shear stress because of the construction of apparatus 10 which is further described as follows, in reference to a preferred embodiment shown in these FIGURES 1, 2, and 3.

Upstanding from blade support, vane shear head or cylinder 24 is a socket head cap screw 28 serving as a rod, stem or shaft 28. Preferably cap 32 and a portion of screw shank 34 are complementary fitted up through a central stepped bore 36 of shear head 24. The head 24 is often made integrally with vanes 18 and as so equipped is called a claw 40.

At top 42 of this stem or shaft 28 threads 44, with endwise clearance, receive an acorn nut 46 where one tool may be applied while another tool is inserted into socket head 48 of cap screw 28 during assembly and disassembly of apparatus 10, as will be described later. Below acorn nut 46, there is an annularly graduated dial assembly. Its dial number plate 52 and its secured dial number decal 54 are non-rotatably positioned on rod, stem or shaft 28.

Directly beneath plate 52 is spacer 58, surrounding rod 28 and resting on a inner bearing ring 62 of a ball bearing 64 which is fitted to stem, rod or shaft 28. Then extending between bearing ring 62 and top 63 of shear head 24 or claw 40 is a spacer sleeve 70 of larger inside diameter than the outside diameter of rod or stem 28. All these components associated with stem or shaft 28, upon tightening of acorn nut 46 become a unified earth contacting sub-assembly 74 with all parts rotating or not rotating together as a unit.

In order to conveniently apply torque and measure any torque applied to this earth contacting sub-assembly 74, a torque applying sub-assembly 76, utilizing a coiled spring 80 is rotatably mounted at bearing 64 to bearing ring 66 and secured to vaned shear head 24 or claw 40. Additional components of this torque-applying sub-assembly 76 are a body 84 serving as a finger gripping knob or handle 84, which may be knurled to provide a good gripping surface 86. Body 84 is fitted to bearing ring 66 around stem or shaft 28. Bearing ring 66 is then positioned axially at its top by a snap ring 88 which is expanded into groove 90 in body 84.

Also, there is a sleeve spring end receiving insert 94 placed about the upper end of spacer-sleeve 70 and forcibly fitted into an accommodating recess 96 of body or handle 84. In such a position, sleeve insert 94 also serves as the lower positioning member for bearing ring 66. An axially aligned and centered bottom opening recess 98 of insert 94 axially positions the upper end of coiled torsion spring 80 which is further non-rotatably secured by set screw 102 positioned in a threaded radial aperture 104 in insert 94. There is an additional larger diameter recess on handle or body 84 forming a downwardly extending flange 108 which helps to provide the larger overall gripping surface 86. The lower end of torsion coiled spring 80 is axially aligned and centered in a recess 110, which is provided in shear head 24 or claw 40 directly below similarly shaped recess 98 located in insert 94. A like size set screw 102 positioned in a threaded, radial aperture 112 formed in claw 40 non-rotatably secures the bottom end of coiled spring 80.

The top portion of handle or body 84 has a large centered cavity forming an upwardly extending flange or rim 114 encircling the periphery of dial number plate 52. On the top surface of this rim or flange 114, a reference point mark 116 is established. As relative movement occurs between torque applying sub-assembly 76 and earth contacting sub-assembly 74, movement of rim mark 116 past numerals, indicating force in tenths of a ton per square foot on dial number decal 54, shows directly to an observer what forces are then being transmitted to earth 12. Underlying such convenient instant resultant force reading is the known relationship that torque or applied shear forces transmitted by employing coiled spring 80 are proportional to the angle of rotation of handle or body 84.

In regard to design considerations in respect to sensitiveness of this torsional vane shear apparatus and thereafter to its final calibrations, the initial selection of spring specifications and actual springs 80 is carefully undertaken. Once a given assembly of components is selected final assembly procedures include what also may be considered as the final calibrations. Also after some use, these procedures to be discussed may be followed again, if calibrations become necessary.

As noted previously, earth contacting sub-assembly 74, upon tightening of acorn nut 46, as tools are applied at the axial ends of screw, rod, stem or shaft 28, becomes a unified sub-assembly 74. Thereafter, all components thereof similarly will rotate or will not rotate together. Before this final tightening, however, respective soil contacting sub-assembly 74 and torque applying sub-assembly 76 are relatively rotated, while no pre-load or substantially no pre-load exists in coil spring 80, to position rim mark 116 at the zero numeral on dial number plate 52. At this time both set screws 102 have been previously tightened to prevent rotation of coiled spring 80, at either of its ends, relative to insert 94 and shear head 24 or claw 40. Set screws 102 have this primary function of preventing relative rotation as illustrated in FIGURE 1. Possibly, as a secondary function they might be used to axially retain the spring 80. However, once final assembly is undertaken, spring 80 is axially very well confined.

Where some pre-loading of spring 80 is desired, or may be desired later and preferably at all times, there is a requirement for having a positive limit to the returning rotative relative movements coinciding with a zero setting when rim mark 116 is back at the zero numeral on dial number plate 52. In FIGURE 1, where torsional shear apparatus 10, under load, is illustrated, such a zero positive limit means is shown using stop pins, which separate as torque is applied. One stop, abutting or limiting zero pin 118, is firmly secured upright in body or handle 84. One of its ends is fitted into body recess 120 which is located at a radial distance from the principal axis of apparatus 10. Recess 120 has its own axis arranged parallel to this principal axis. The other stop, abutting or limiting zero pin 124 is firmly secured at one end in plate recess 126. Stop pin 124 depends from dial number plate 52 at a like radial position from the principal axis of apparatus 10. Also its own axis is also parallel to this principal axis.

Such zero positive limit zero-means could be modified by providing a different circular groove than groove 128 in body or handle 84. Such different groove 128 could also serve as an overall motion controlling groove for stop zero pin 124. Or vice versa, for example, dial number plate 52 could be increased in depth to include spacer 58, the latter being radially expanded, and then provided with a controlling groove. Then body or handle 84 would be complementarily modified to include a stop zero pin 118 or its equivalent.

This change is like others which could be undertaken while still creating a torsional vane shear apparatus which, upon use, fulfills the purpose of and meets the objectives of this invention. For example of another change, a "Teflon" washer, sleeve, or hollow cylinder could be relied upon as a bearing in lieu of the illustrated ball bearing. In regard to changes, at all times as many components as possible should be axially-overlapping and/or surrounding one another to reduce bearing requirements and to keep the overall axial length at a convenient self-serving minimum, thereby enhancing the astute and reliable handling of this apparatus when a soil test is made to obtain very accurate data.

I claim:
1. A soil shear device, comprising:
   a vaned shear head having an upstanding stem including a reference-marked dial fixedly secured normal to its upper end, the vanes on said head being radially directed relative said head axis;
   a spacer sleeve mounted with clearance about part of the upstanding stem below the dial and resting on the shear head;
   a manually engageable knob mounted for frictionless rotation on said stem beneath the said dial and bearing upon the said spacer sleeve and having a rim carrying a reference point juxtaposed to the edge of the reference-marked dial; and
   a coiled torsion spring encircling said spacer and said stem between and anchored at its ends respectively to said shear head and said knob whereby rotation of the latter imparts torsional force on the shear head and its vanes and movement of said knob reference point relative said reference-marked dial provides an unobstructed direct reading of the rotation of said knob relative said shear head and of torque applied thereto.

References Cited

UNITED STATES PATENTS

| | | | |
|---|---|---|---|
| 2,256,478 | 9/1941 | Hill | 73—139 |
| 2,603,967 | 7/1952 | Carlson | 73—84 |
| 3,057,194 | 10/1962 | Waters et al. | 73—139 |
| 3,116,633 | 1/1964 | Cohron | 73—101 |

FOREIGN PATENTS 134.834  3/1952  Sweden.

RICHARD C. QUEISSER, *Primary Examiner.*

JAMES J. GILL, *Examiner.*

J. H. WILLIAMSON, *Assistant Examiner.*